United States Patent [19]

Hartkopf et al.

[11] Patent Number: 4,641,243

[45] Date of Patent: Feb. 3, 1987

[54] COMPUTER-CONTROLLED INTERLOCKING SYSTEM FOR A RAILWAY INSTALLATION

[75] Inventors: Hans O. Hartkopf, Braunschweig; Adalbert Zillmer, Wolfenbuettel, both of Fed. Rep. of Germany

[73] Assignee: Siemens Aktiengesellschaft, Berlin and Munich, Fed. Rep. of Germany

[21] Appl. No.: 625,530

[22] Filed: Jun. 28, 1984

[30] Foreign Application Priority Data

Jun. 28, 1983 [DE] Fed. Rep. of Germany ....... 3323269

[51] Int. Cl.$^4$ .................. B61L 21/00; G06F 15/48
[52] U.S. Cl. .................... 364/436; 246/131; 246/187 A; 246/187 R; 364/132
[58] Field of Search ............... 364/436, 131, 426, 424, 364/132, 133; 246/187 R, 187 A, 187 B, 187 C, 21, 24, 26, 27, 28 R, 182 AA, 182 AB, 131, 132, 146, 133; 318/563

[56] References Cited

U.S. PATENT DOCUMENTS

| | | | |
|---|---|---|---|
| 3,305,828 | 2/1967 | Aver et al. | 364/436 |
| 4,015,804 | 4/1977 | Dobler et al. | 364/436 |
| 4,023,753 | 5/1977 | Dobler | 364/436 |
| 4,093,161 | 6/1978 | Aver, Jr. | 364/436 X |
| 4,122,523 | 10/1978 | Morse et al. | 364/436 |
| 4,181,945 | 1/1980 | Adler et al. | 364/436 |
| 4,284,256 | 8/1981 | Norton | 246/131 |
| 4,327,415 | 4/1982 | Rush et al. | 364/436 |

Primary Examiner—Felix D. Gruber
Assistant Examiner—Thomas G. Black
Attorney, Agent, or Firm—Hill, Van Santen, Steadman & Simpson

[57] ABSTRACT

A computer-controlled interlocking system for a railway installation which comprises a plurality of sections, each of which sections has an associated plurality of elements, comprises a plurality of section computers to be respectively associated with the sections and arranged to be fail-safe in terms of signaling technology. Each section computer is provided with a respective program memory which, in turn, is provided with programs relating to the processing of requirements for control, both individual and in relation to routes, of all the associated plurality of roadway elements independently of their presence an arrangement in the relevant section. Each section computer also has a write/read memory arranged for receiving and storing installation-specific data relating to the railway installation topography and the respective element characterization in terms of type of element, element program, element designation and the arrangement of the elements relative to neighboring elements. An input computer is provided in common to all of the section computers and arranged to be fail-safe in terms of signaling technology. The input computer is arranged storing the installation-specific data and to transfer the installation-specific data to the write/read memories of the section computer during a loading phase prior to initial operation of the system.

4 Claims, 2 Drawing Figures

COMPUTER-CONTROLLED INTERLOCKING SYSTEM FOR A RAILWAY INSTALLATION

BACKGROUND OF THE INVENTION

1. Field of the Invention

The present invention relates to a computer-controlled interlocking system for a railway installation which is divided into subsidiary sections, in which, for the control of the roadway elements assigned to the respective subsidiary sections, special computers (section computers) are provided which are fail-safe in terms of signaling technology.

2. Description of the Prior Art

An electronic interlocking system of the type set forth above is generally known, for example, from the brochure F-516 of Siemens AG entitled "All Clear for the Future: Electronic Interlocking" in which a railway installation which is to be controlled is divided into a plurality of adjacent subsidiary sections (Section 1, Section 2) which extend parallel to the main direction of travel, and each subsidiary section is controlled by way of an individual central unit (section computer) which monitors the interlocking function.

In a compound computer system, each unit is planned and programmed in accordance with its function and a processing peripheral assigned thereto. In the case of the electronic interlocking system based on the section computer principle, it would therefore be necessary to plan individually all the computers within a system. This planning and programming of each individual computer is necessary both during the construction of the installation and also, for example, on the occasion of each alteration. If the track system is to be altered, it is necessary to intervene in the hardware and software of the individual computers, i.e. changes must be made in the data supply of the read only memories (ROMs) of all the computers. This can only be carried out by the manufacturer; therefore, the expense for amending the memory contents is considerable. Since, for reasons of ensuring reliability in railway signaling technology, a change in the data in the memories of the individual section computers also necessitates an extensive checking of the memory contents and for this purpose access must be provided to the individual section computers, it is extremely problematic to restore the operation of a modular interlocking system of this kind following a change in the system configuration or a change in the division of the system into individual subsidiary sections.

The use of a special computer which is fail-safe in terms of signaling technology to control the master data of a railway installation is already known from the German published application No. 31 27 363, fully incorporated herein by this reference. In the interlocking system disclosed therein, which is controlled by a plurality of individual computers, the individual computers must fulfill different functions within the control sequence. Therefore, for example, there is a computer for the command handling, a computer for the route requirement, a computer for the formation of routes, a computer for the dissolution of routes, and, amongst others, a computer for the status control. This computer obviously serves mainly for documentation purposes, but at least it does not serve to convey system-specific data to the other computers within the computer system in a loading phase. If it were desired to transfer the function-divided computer system disclosed in the aforementioned German published application to a computer system which is assigned to individual subsidiary sections of an installation, this would mean that in place of a central unit for the control of a subsidiary section a plurality of function classified computer units would need to be provided for each subsidiary sections. This would mean that each subsidiary section would have to be assigned an individual computer for the status characterization which would involve precisely the same disadvantages set forth above.

SUMMARY OF THE INVENTION

It is therefore the object of the invention to provide a device for operating a computer-controlled interlocking system which facilitates a rapid and problem-free operation of the interlocking system or re-operation following a change in the system.

According to the invention, the above object is achieved in that there is provided a computer-controlled interlocking system for a railway installation which comprises a plurality of sections, each of which has an associated plurality of roadway elements. The system comprises a plurality of section computers to be respectively assigned with the sections and arranged to be fail-safe in terms of signaling technology. Each section computer is provided with a respective program memory which is provided with programs relating to the processing of requirements for control, both individual and in relation to routes, of all of the associated plurality of roadway elements independently of their presence and arrangement in the relevant section. Each section computer also has a write/read memory arranged for receiving and storing installation-specific data relating to the railway installation topography and the respective element characterization in terms of element type, element program, element designation and the arrangement of the elements relative to neighboring elements. An input computer is provided in common to all the section computers and arranged to be fail-safe in terms of signaling technology, the input computer being arranged for storing the installation-specific data and to transfer such data to the write/read memories of the section computers during a loading phase prior to initial operation of the system.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
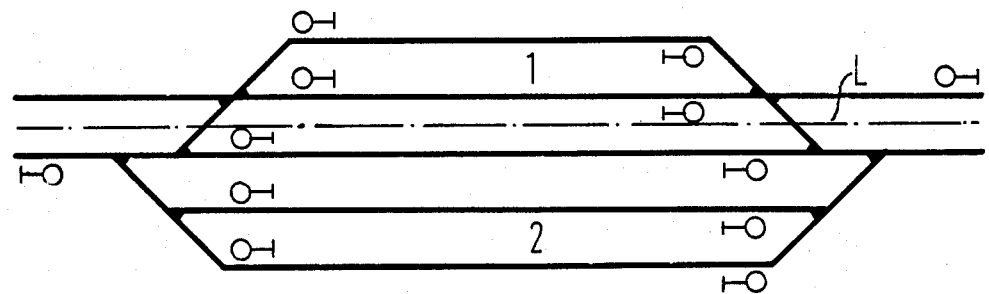
FIG. 1 is a schematic diagram of a railway installation forming part of a small railway which is to be controlled by an electronic interlocking system embodying the present invention.

The railway installation shown in FIG. 1 comprises five tracks, six switch points, two double slip points, two incoming signals and 10 outgoing signals. The railway installation is shown divided by a chain line L, extending in the main direction of travel, into two subsidiary sections of which the upper section on the drawing is identified as Section 1 and the lower section on the drawing is identified as Section 2.

Figure 2:
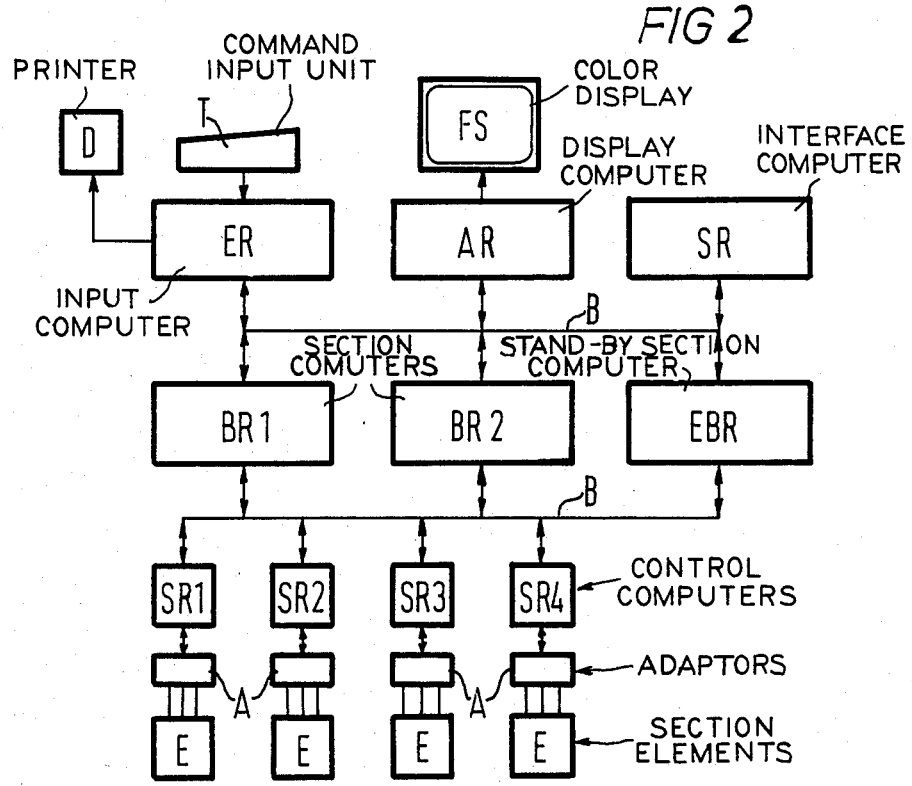
FIG. 2 is a block schematic diagram of an electronic interlocking system constructed in accordance with the present invention for controlling the railway installation illustrated in FIG. 1.

For the control of roadway elements within the individual sections, in accordance with FIG. 2, section computers BR1 and BR2 are provided. By way of assigned control computers SR1, SR2, SR3 and SR4 and adaptors A, these section computers act upon elements of the outside installation and from these receipt messages concerning the actual status of these elements. The function of the control computers, which are designed so as to be fail-safe in terms of signaling technology, is not only to control and monitor the outside elements, but also to check their operation by the emission of test commands and the analysis of return messages.

The section computers comprise the processing units for the actual interlocking system logic. Each section computer contains the processing programs for all of the possible types of elements regardless of whether or not these are contained in the subsidiary section which is to be controlled. These processing programs are both railway authority-specific and also function-specific.

The railway authority-specific programs include, for example, the determining of specific route monitoring and resolution procedures, whereas the function-specific programs include, for example, the computer-internal interrogation of the adjacent roadway elements, signal term selection. These programs are stored in the program memory of the section computers, a ROM or an EPROM, so as to prevent their loss. However, these programs alone do not permit the section computers to control the assigned railway installation. The reason for this is that before beginning operation the computers have no knowledge of the railway installation which is to be controlled, i.e. the sequence of the roadway elements and the characterization of the individual types of elements. They are only provided with this information by a special computer, the input computer ER, during a loading phase which precedes the beginning of operation.

In its storage switching means, the input computer ER contains a railway data list. This list is the result of the planning phase of the installation and contains all of the information concerning the railway topography, the division of the railway installation into individual subsidiary sections, different element programs and other element-dependent data.

The track topography contains not only the sequence of specific roadway elements, but also the assignment of precisely-defined track marks (marks for the straight and curved sides of a switch) to these roadway elements and information concerning the tracks of the roadway elements which adjoin the individual tracks of the relevant roadway elements. This facilitates a travel-direction dependent handling of the individual roadway elements in the computer and also the handling of these elements in the case of roadway branches.

The section division indicates which roadway elements are to be assigned to which computer section in which configuration.

The term "element programs" is to be understood, for example, as meaning special handling procedures for the individual roadway element, for example when a switch point is provide double protection (a safety switch which is marked in both direction, which means in the straight and curved positions), is to assume a preferred position in a non-stressed state, or is insulated in non-profile free fashion (i.e. there are no wheels indicated as occupying the track, but the carriage overhangs the track circuit and may be rammed by other cars), which can influence the capacity of the switch point section to report itself free.

The element-dependent data also includes, for example, information concerning the lengths of individual track sections and the assignment of specific maximum speeds to individual track sections or line zones.

A further function of the input computer is, for the representation of the installation which is to be controlled by way of the interlocking system, to show an enlarged section of the installation for the required representation of a specific subsidiary section on a screen. This subsidiary section need not absolutely correspond to one of the subsidiary sections defined in FIG. 1.

A further function of the input computer is to check the commands with which it is supplied, for example from a traffic superintendent via a command input unit T (a keyboard) in respect of the formal errors and plausibility. In this respect, the input computer has obtained an instruction for route-providing from the input, for example a command for route setting. This commences at the target element of the routes which are to be formed and leads, via the neighboring address investigation, to the start element of the route. The permissibility of the route is tested, i.e. it is established whether the individual roadway elements are available or not for the formation of the route.

In the event of a positive result to the test the input computer supplies to the section computer, which is assigned to the target element of the route, a message with a request to establish the route. This is carried out via a bus system B which connects the computers to one another. The command message to establish the route is now forwarded by the section computer or computers from element-to-element and, in the storage switching device of the second computers assigned to the individual roadway elements, sets corresponding nominal marks, e.g. the characterization of a target requirement. From the start element of the route which is to be formed, the approval of the route connection is communicated to the input computer; the input computer can now possibly instigate the further permissibility check for another route.

The other phases of the element handling take place only at the section computer level and the associated control computer level. They are triggered by certain nominal marks set in the connection phase. If a section computer recognizes the necessity to adjust an outside element, e.g. to reverse a switch point or the signal setting, it emits a control command for the element in question to the associated control computer. The control process itself is controlled and monitored by way of the control computer.

The actual status of the outside installation is cyclically interrogated by the control computers and communicated to the associated section computer. The section computer supplements these messages with section computer internal message bits and communicates the actual status of the elements to the input computer ER for tracing out, via a printer D, and to a display computer AR. The display computer AR serves to provide a representation of the installation which is to be controlled, on a color viewing device or color display FS and to provide representations of the operational event, i.e. to characterize switch point positions, track occupation, route requirements, etc. From the messages with which it is supplied from the section computers, the display computer AR cyclically brings up to date the information picture of the color display FS. The function of a special interface computer is to prepare and make available the existing data for train direction and remote control.

If it is necessary to change the railway topography or to change element-dependent data, no intervention is needed in the ROMs of the section computers which, as already explained above, would lead to a considerable testing expense. Instead, in this case it is only necessary to replace the ROM of the input computer which contains the railway topography and the element-dependent data with a storage module which has been appropriately brought up to date. This storage module can be tested in respect of the data contained therein prior to the exchange. Then, in a loading phase which precedes the return to operation of the interlocking system, the input computer transfers the data stored therein sectionwise to the individual section computers which, on the transfer of this date, can resume operation.

The advantages represented by the storage of the topographic and element-dependent data in the ROMs of only a single computer are particularly manifest when the interlocking system is assigned not only the section computers needed to control the individual subsidiary sections, but also, for redundancy reasons, a stand-by section computer EBR. If, in fact, one of the section computers breaks down for any reason, the input computer can now convey the data previously dispatched thereto to the stand-by section computer EBR and the stand-by section computer EBR is immediately available, in combination with the other section computers which are still active, to carry out the interlocking system control. The rapid operation of the stand-by section computer is only possible since the topographic and element-dependent data required for its operation are stored in the storage module, separate from the no-longer functioning section computer, from which they can be transferred without effort. The section computers themselves are naturally identical in construction and before the loading phase contains the same program which relate to the element handling. The setting-up or resetting of a section computer is, however, not only necessary in the event of a change in the installation-specific or element-specific data or a change in the system division, but also, for example, when the current supply of a computer temporarily breaks down. In such a case, the data stored in its write/read memory relating to the subsidiary section of the installation which is to control are lost and must be input again via the input computer.

Therefore, prior to being set in operation, the individual section computers contain only the railway authority specific software and function-specific element handling programs (processing programs for all occurring types of elements). Before operation, they have no knowledge of the railway installation which is to be controlled. The railway installation is described in a railway data list in the input computer and is communicated to the individual section computers in the loading phase. Not until then do the section computers become functional for the control of the railway installation.

The system described above for the operation of a computer-controlled interlocking installation is independent of the size of the interlocking installation which is to be controlled and also independent of the extent to which the function division is sub-classified in the superordinate computer level which is common to all of the section computers, i.e. rather, as in the present example, three computers are provided or more or less computers are advantageous.

Although we have described our invention by reference to a particular illustrative embodiment thereof, many changes and modifications may become apparent to those skilled in the art without departing from the spirit and scope of the invention. We therefore intend to include within the patent warranted hereon all such changes and modifications as may reasonably and properly be included within the scope of our contribution to the art.

We claim:

1. A computer-controlled interlocking system for a railway installation which comprises a plurality of sections each of which has an associated plurality of roadway elements, said interlocking system comprising:
   a plurality of section computers for respective association with said sections, including means for fail-safe operations;
   each section computer connected to the associated roadway elements and comprising a respective program memory which is provided with programs relating to the processing of requirements for control, both individual and in relation to routes, of all the associated plurality of roadway elements independently of their presence and arrangement in the relevant section;
   each section computer also comprising a write/read memory for receiving and storing data relating to the railway installation topography and for receiving and storing data relating to the individual roadway elements in terms of element type, element program, element designation and the arrangement of the elements relative to neighboring elements; and
   an input computer connected in common to all the section computers, including means for fail-safe operations, said input computer including a read-only memory for storing said data relating to the railway installation topography and the individual roadway elements and to trasnfer said data to said write/read memories of the section computers during a loading phase which precedes operation of the system.

2. The system as claimed in claim 1, wherein:
   on the recognition of a processing error or in the event of an interruption in its energy supply, each section computer comprises means for disconnecting automatically and subsequently reconnecting of the computer in dependence on the previous execution of a loading phase.

3. The system as claimed in claim 1, wherein:
   said read only memory of the input computer, in the event of a change in the data relating to the railway installation topography or the individual roadway elements is to be exchanged for a different read-only memory which contains the valid data, and means for transferring of the data into the section computers is carried out by means of a loading phase which precedes operation subsequent to the change.

4. The system as claimed in claim 1, and further comprising:
   at least one further section computer which, when one of the section computers breaks down, is supplied by the input computer with the data relating to the railway installation topography and the individual roadway elements which are valid for this section computer and then substitutes said section computer.

* * * * *